United States Patent [19]

Myers

[11] Patent Number: 5,790,260
[45] Date of Patent: Aug. 4, 1998

[54] OFFLINE DIGITIZING OF ITEMS FOR SUBSEQUENT IMAGE PROCESSING

[75] Inventor: Charles G. Myers, Indianapolis, Ind.

[73] Assignee: Financial Ware, Inc., Indianapolis, Ind.

[21] Appl. No.: 555,160

[22] Filed: Nov. 8, 1995

[51] Int. Cl.$^6$ ............................................. G06K 13/16
[52] U.S. Cl. .................. 358/296; 395/601; 382/137
[58] Field of Search .................. 358/296; 382/137–140; 395/601, 800

[56] References Cited

U.S. PATENT DOCUMENTS

| | | | |
|---|---|---|---|
| 4,510,619 | 4/1985 | LeBrun et al. | 382/57 |
| 4,774,569 | 9/1988 | Morton et al. | 358/102 |
| 4,833,722 | 5/1989 | Morton et al. | 382/22 |
| 4,853,795 | 8/1989 | Morton et al. | 358/447 |
| 4,868,670 | 9/1989 | Morton et al. | 358/447 |
| 4,888,812 | 12/1989 | Dinan et al. | 382/7 |
| 4,982,294 | 1/1991 | Morton et al. | 358/465 |
| 5,113,455 | 5/1992 | Scott | 382/47 |
| 5,113,494 | 5/1992 | Menendez et al. | 395/163 |
| 5,132,808 | 7/1992 | Higuchi et al. | 358/403 |
| 5,155,341 | 10/1992 | Ohtani et al. | 253/375 |
| 5,170,466 | 12/1992 | Rogan et al. | 395/145 |
| 5,191,525 | 3/1993 | LeBrun et al. | 364/419 |
| 5,221,830 | 6/1993 | Kern | 235/379 |
| 5,301,350 | 4/1994 | Rogan et al. | 395/800 |
| 5,319,745 | 6/1994 | Vinsonneau et al. | 395/144 |
| 5,321,527 | 6/1994 | Copenhaver et al. | 358/474 |
| 5,331,435 | 7/1994 | Scott | 358/479 |
| 5,344,132 | 9/1994 | LeBrun et al. | 271/35 |
| 5,349,170 | 9/1994 | Kern | 235/379 |
| 5,359,667 | 10/1994 | Borowski et al. | 382/7 |
| 5,367,386 | 11/1994 | Copenhaver et al. | 358/474 |
| 5,469,241 | 11/1995 | Takahashi et al. | 355/64 |
| 5,544,043 | 8/1996 | Miki et al. | 364/406 |

OTHER PUBLICATIONS

Butler, Cheryl; "Small Wonder in Delaware: An outside conversion house offers security for a state agency."; *Inform*; Jul./Aug. 1990; vol. 4, No. 7; pp. 20, 22–23.

*Primary Examiner*—Peter S. Wong
*Assistant Examiner*—Gregory J. Toatley, Jr.
*Attorney, Agent, or Firm*—Woodard, Emhardt, Naughton, Moriarty & McNett

[57] ABSTRACT

A method of off-line digitizing item images for subsequent image processing. In a financial institution application of the present invention, all items to be processed are fed through a reader/sorter, which reads the MICR data on the item, stores this transaction data on an attached computer, endorses the item, microfilms the front and back of each item, and then sorts the items. In a first embodiment off-line operation, the microfilm is digitized and the digitized images are stored in a disk storage unit. In a second embodiment off-line operation, the sorted items are digitized directly (after being processed by the reader/sorter) and the digitized images are stored on a disk storage unit. Image enhancement algorithms may be employed due to the fact that the digitizing process is off-line and such enhancement algorithms will not slow the reading/sorting process. The microfilm is then retained as an archival copy. Software is then used to link the transaction data in the computer database to the digitized images on the disk. Thereafter, statement rendering is greatly simplified, as only the digitized check images need to be included with the customer statement, rather than the actual cancelled checks. This eliminates the subsequent check sorting operation, simplifies the statement rendering operation, and reduces the postage costs associated with mailing the statements. Furthermore, the method of the present invention does not require the financial institution to purchase a new reader/sorter apparatus in order to create digitized item images.

21 Claims, 8 Drawing Sheets

OFFLINE DIGITIZING OF ITEMS FOR SUBSEQUENT IMAGE PROCESSING

TECHNICAL FIELD OF THE INVENTION

The present invention relates generally to item image processing and, more particularly, to a method of off-line digitizing item images for subsequent image processing.

BACKGROUND OF THE INVENTION

The present invention is described herein with reference to item processing in financial institutions. Those skilled in the art will recognize that the application of the present invention is not limited solely to item processing in financial institutions, but is rather applicable to any field in which a large number of items must be processed.

On a daily basis, financial institutions must process all of their customer and internal transactions, such as deposits, loan payments, cashed checks, general ledger, cash transactions, Social Security checks, etc. In financial institutions, there are two major groups of items: "transit items" (items that have accounts at other (originating) financial institutions) and "on-us items" (items that have accounts at the processing financial institution). All of the processed items, such as bank checks, are either transit items or on-us items. Every on-us item that an institution accepts must be processed for eventual customer account update. This is known as "item processing".

Figure 1:
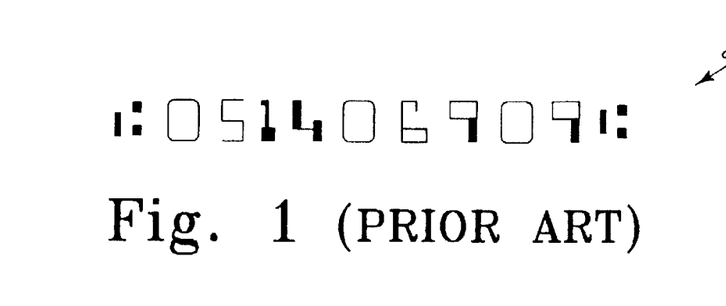
FIG. 1 is a prior art Magnetic Ink Character Recognition (MICR) numeral.

For many years, such item processing in financial institutions has been largely automated, in order to cope with the extremely large number of items which must be processed on any given day. In order to facilitate such automatic item processing, data from the items is automatically read by the processing equipment using a process known as Magnetic Ink Character Recognition (MICR). Each of the items to be processed by the equipment contain numerical codes printed in a special magnetic ink. For example, FIG. 1 illustrates such MICR data, indicated generally at 10. Such MICR data 10 printed on the bottom of each item provide important information about the type of item being processed.

Figure 2:
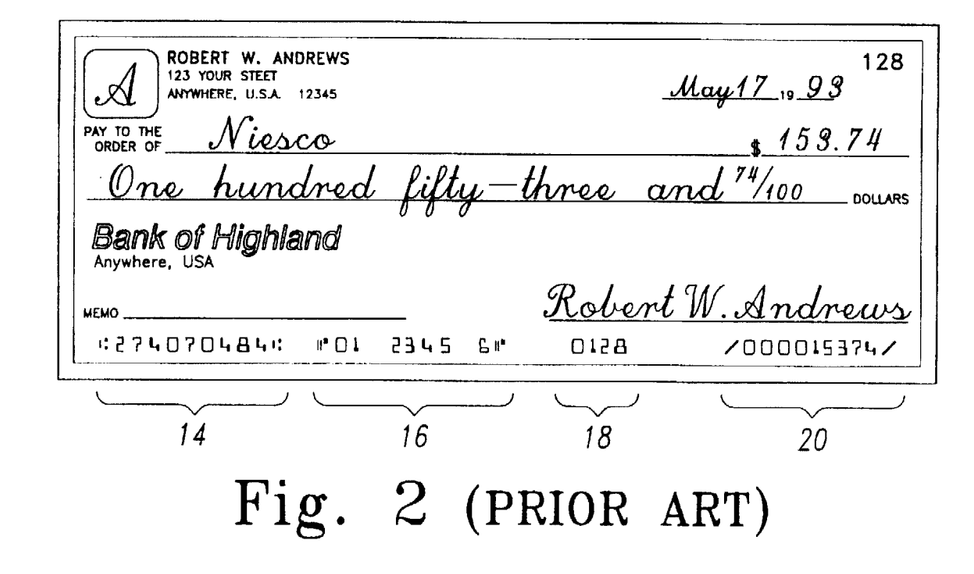
FIG. 2 is a prior art check including MICR data on a bottom edge thereof.

A common bank check is illustrated in FIG. 2 and indicated generally at 12. Each check 12 includes a series of numbers across its bottom edge which are printed in MICR ink. These numbers are grouped into predefined MICR fields, such as a bank number 14, an account number 16, a check number 18, and an amount 20. The bank number 14 indicates which financial institution the check originated from, and consequently indicates whether the check is a transit item or an on-us item. The account number 16 indicates which customer account at that financial institution the check has been drawn upon. The check number 18 sequentially numbers each of the customer's checks. The amount 20 indicates the amount for which the check was written by the customer. The amount 20 must be added to the bottom of the check (or "proved") by a human operator prior to the automatic sorting of the check. This is required as the sorting equipment is presently unable to read the amount written by the customer on the face of the check with great enough reliability. A standard for the placement of these numeric fields of information on financial institution items was set up in the early 1950's by the Federal Reserve.

Figure 3:
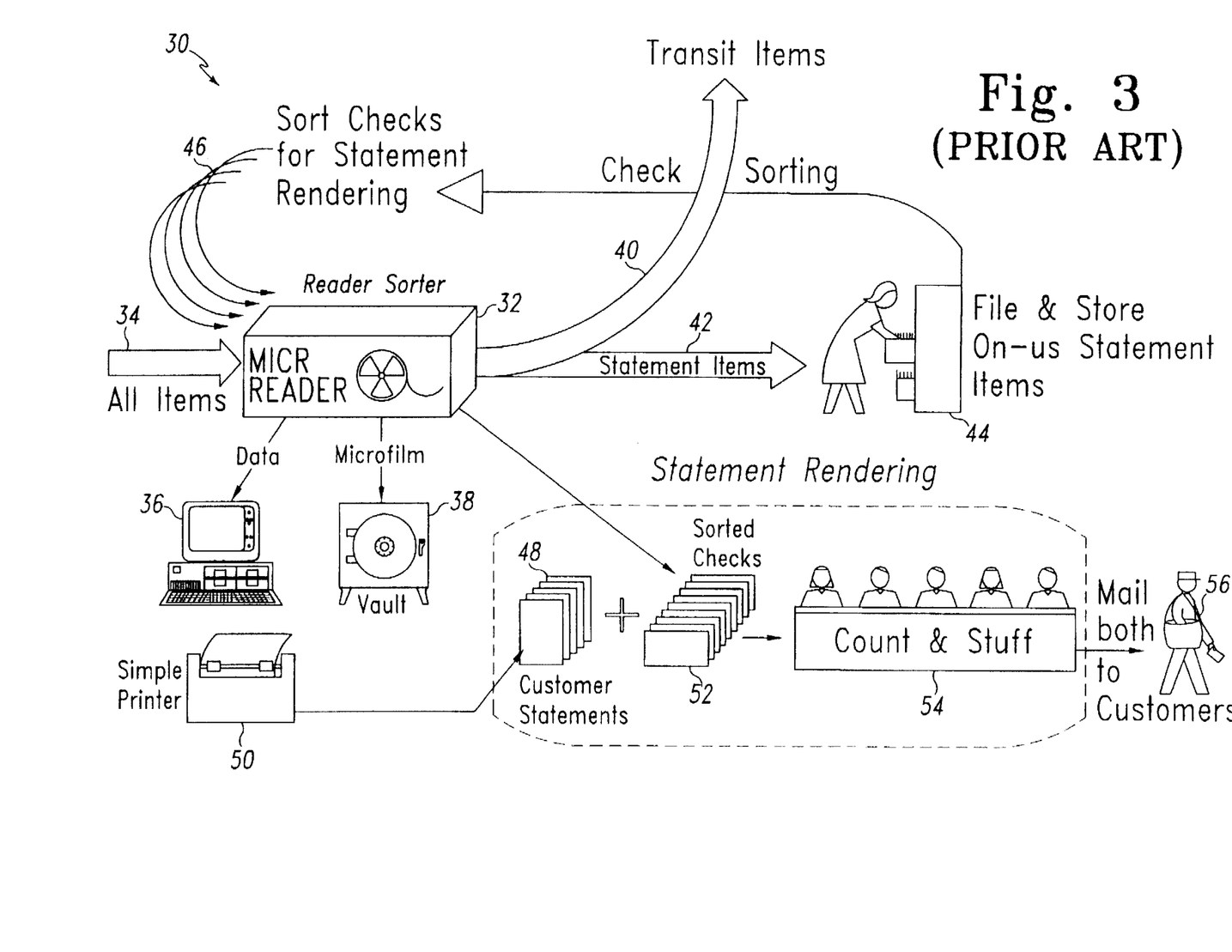
FIG. 3 is a schematic process flow diagram of a prior art item processing procedure.

The traditional method for automated item processing is illustrated schematically at FIG. 3 and indicated generally at 30. The traditional method 30 was based upon a reader/sorter apparatus 32 which performed four main functions: MICR data reading, endorsing, microfilming and sorting. All of the items which must be processed by the financial institution are loaded into an input hopper 34 which feeds the items one at a time into the reader/sorter 32. The reader/sorter reads the MICR encoded numeric fields on the bottom of each of the items and stores the bank number 14, account number 16, check number 18 and amount 20 in a transaction data file on an associated computer 36. This data will later be used to perform the "proof" (or "balancing") operation for all of the financial institution's transactions on any given day. The back of each item is endorsed by the reader/sorter 32, and then a microfilmer which is incorporated into the reader/sorter 32 takes a microfilm photograph of the front and back of each of the items. After microfilming, the reader/sorter 32 sorts the items into various pockets in the reader/sorter 32, the sorting being based upon the type of item. The items are microfilmed sequentially onto large microfilm rolls, which are developed and stored in a vault 38 for archival purposes when each roll has been filled and developed.

After all of the items have been read, endorsed, microfilmed and sorted, the transit items 40 are physically sent back to their originating financial institutions (perhaps via the Federal Reserve or a correspondent bank), while the on-us items 42 are physically filed in storage cabinets 44. Once all of the items have been processed through the reader/sorter 32, the proof for the financial institution may be performed using only the data stored on the computer 36.

The financial institution must prepare and send a statement to each of its customers on a monthly basis which summarizes all of the transactions which have been posted to the customer's account and which returns each of the "cancelled" (i.e. endorsed) checks. Therefore, it is necessary to retrieve the on-us items 42 from the storage cabinet 44 on a periodic basis (usually monthly) and run them through the reader/sorter 32 in a check sorting operation 46. During the check sorting operation 46, the reader/sorter 32 reads the account number 16 from each check and sorts the checks into account number sequence order or customer statement order. The customer statements are printed (statement rendering) using a printer 50 based upon the transaction information stored in the computer 36. The sorted checks 52 are then matched to the correct customer statement 48. Bank personnel 54 then count the sorted checks to make sure that the number of checks match the statement's printed enclosure count and then stuff both the statement 48 and the sorted checks 52 into envelopes which are mailed to customers at 56.

In the traditional MICR reading-endorsing-microfilming-sorting method 30, an item's picture on microfilm is an institution's ledger record of all depositors' checking accounts. It is also a complete record of transit checks (leaving the institution) because it has recorded these items in their original state for future reference. Furthermore, the microfilm is legally accepted throughout the world as an archival copy. Therefore, the microfilm provides a method for retrieving both the front and back of an item if it is subsequently lost, damaged or destroyed.

Figure 4:
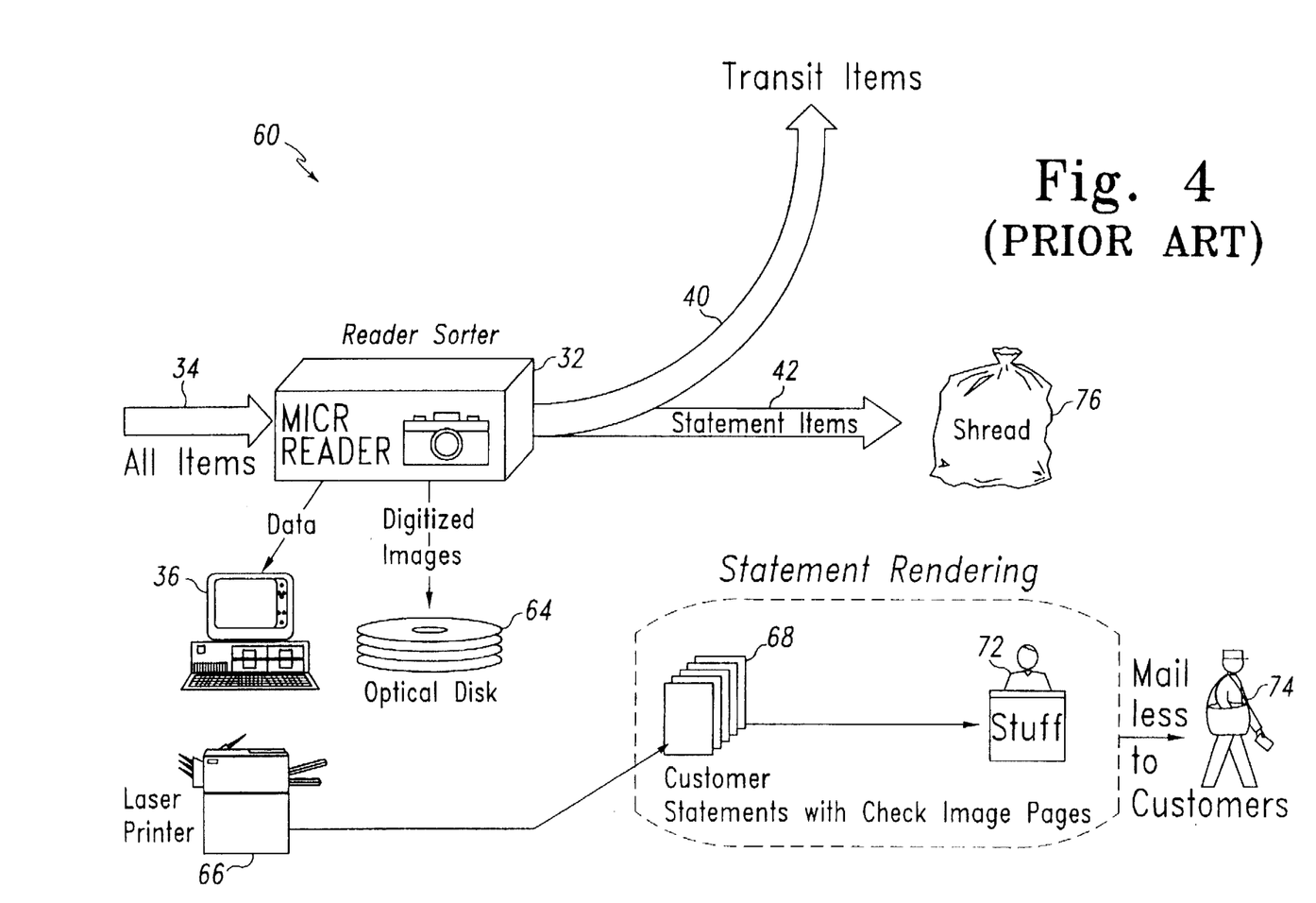
FIG. 4 is a schematic process flow diagram of a prior art item and image processing procedure.

Recently, an alternative to the traditional MICR reading-endorsing-microfilming-sorting method 30 of FIG. 3 has been offered which uses the MICR reading-endorsing-digitizing-sorting approach 60 of FIG. 4. In the approach 60, all of the items which must be processed by the financial institution are still loaded into the hopper 34 and fed sequentially into a reader/sorter 62, however this reader/sorter 62 includes a digitizing camera. Like the reader/sorter 32 of FIG. 3, the reader/sorter 62 of FIG. 4 reads the MICR data on the bottom of each item and stores this data onto the computer 36 for later proof of deposit. The reader/sorter 62 also endorses the back of each item. However, rather than microfilming the front and back of each item (as in the process 30 of FIG. 3), the reader/sorter 62 uses a digitizing camera to create a digitized image of the front and back of each item which is then stored on storage unit 64 (such as an optical disk). After digitizing, the items are sorted into transit and on-us items by the reader/sorter 62 in the traditional manner. The transit items 40 are then sent back to the originating financial institutions.

Figure 5:
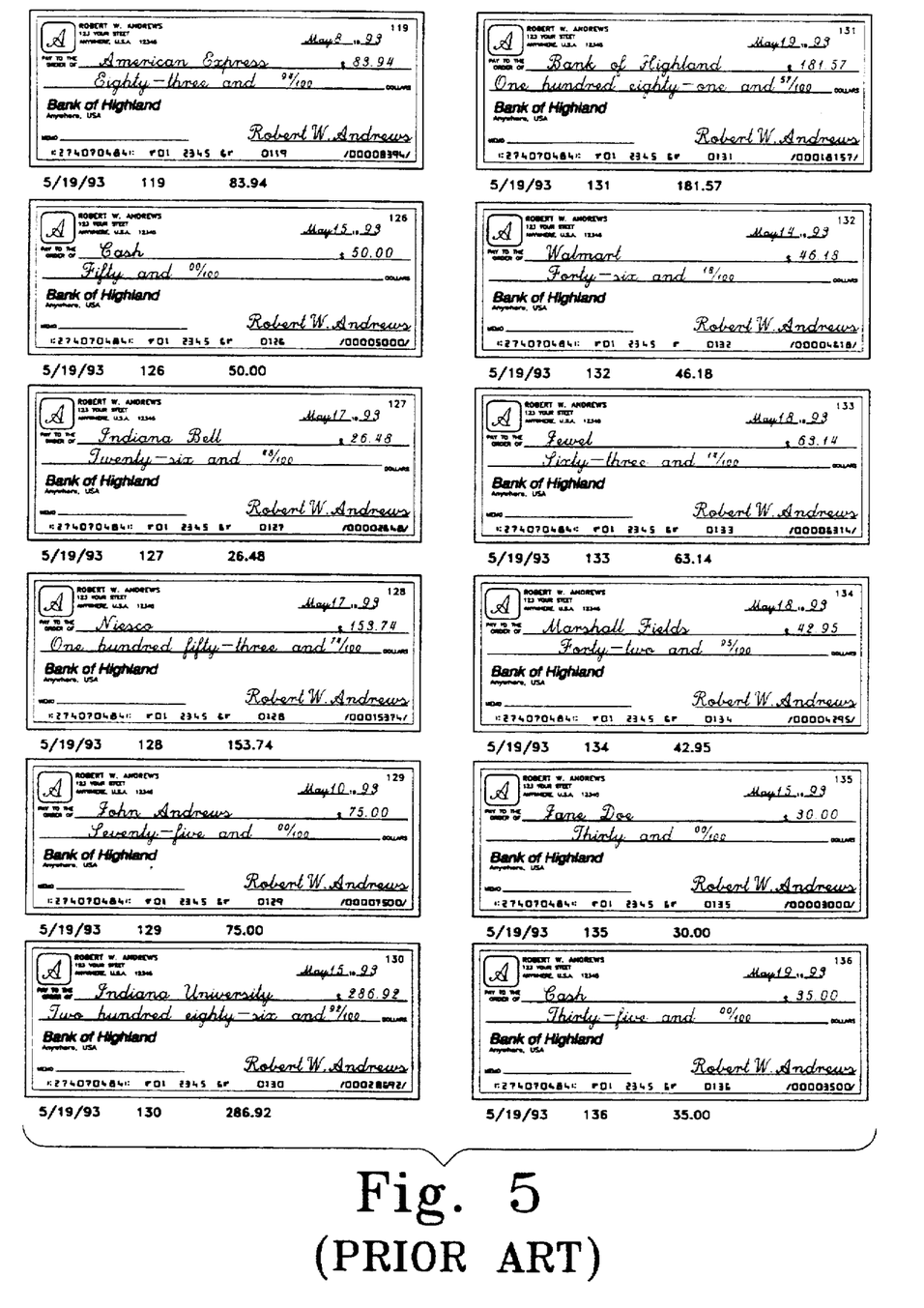
FIG. 5 is a prior art digitized image of cancelled checks in a customer statement.

Statement rendering in the process 60 is performed without returning the cancelled checks to the customer. Instead of sorting the on-us items (as in the check sorting operation 46 of FIG. 3), a high quality laser printer 66 is used to render customer statements 68 which include digitized check images as well as the MICR data that posted to the customer's account. An example of the digitized check images from such a customer statement 68 is illustrated in FIG. 5. Each page of the statement 68 includes the digitized images of a plurality of cancelled checks. Associated with each of the checks is information 70 including the posting date, the MICR check number 18 and the check amount 20 (see FIG. 2). The customer statements 68 are then stuffed into envelopes at 72 and then mailed to the customers at 74 (see FIG. 4).

The process 60 of FIG. 4 has several advantages over the process 30 of FIG. 3. For example, because the physical on-us items 42 are not returned to the customers with the customer statement 68, they may be shredded at 76 after a predetermined grace period. This completely eliminates the check sorting operation 46 of FIG. 3. Additionally, the ability of the computer 36 to process, catalog, print, sort and store an item's digitized image (in addition to the item's numeric MICR data) is much more efficient than handling the physical items themselves. This leads to faster research when there is a need to access the image of a previously sorted item, faster statement rendering, and lower postage costs without the requirement to return the heavy and bulky cancelled checks to each customer.

However, the MICR reading-endorsing-digitizing-sorting process 60 also has some serious drawbacks. First, the process 60 does not create a microfilm archival copy of each of the items processed by the financial institution. Such microfilm is legally accepted throughout the world as an archival copy. The digitized images which are stored on the computer optical disks 64 have not fully reached this status. Furthermore, the major drawback of the process 60 is that very few financial institutions can afford the equipment which is necessary to implement the reader/sorter 62. Not only does the old microfilm reader/sorter 62 have to be completely discarded (these machines cost approximately $250,000), but a new digitizing camera reader/sorter 62 must be purchased at a cost of up to $500,000. Additionally, further substantial costs associated with such a conversion are incurred in the need to re-train employees on how to use the new equipment.

There is therefore a need for a process which allows the incorporation of image processing into the item processing operation, but which does not require that all of the institution's old equipment be discarded in favor of new and extremely expensive equipment. Furthermore, there is a need for a process which allows image processing of digitized images while still retaining a microfilm archival copy of each of the items. This will be a significant benefit until such time (if ever) digitized images on computer optical disk achieve legal status as an archival copy. The present invention is directed toward meeting these needs.

SUMMARY OF THE INVENTION

The present invention relates to a method of off-line digitizing item images for subsequent image processing. In a financial institution application of the present invention, all items to be processed are fed through a reader/sorter, which reads the MICR data on the item, stores this transaction data on an attached computer, endorses the item, microfilms the front and back of each item, and then sorts the items. In a first embodiment off-line operation, the microfilm is digitized and the digitized images are stored on a disk storage unit. In a second embodiment off-line operation, the sorted items are digitized directly (after being processed by the reader/sorter) and the digitized images are stored on a disk storage unit. Image enhancement algorithms may be employed due to the fact that the digitizing process is off-line and such enhancement algorithms will not slow the reading/sorting process. The microfilm is retained as an archival copy. Software is then used to link the transaction data in the attached computer to the digitized images on the disk. Thereafter, statement rendering is greatly simplified, as only the digitized check images need to be included with the customer statement, rather than the actual cancelled checks. This eliminates the subsequent check sorting operation, simplifies the statement rendering operation, and reduces the postage costs associated with mailing the statements. Furthermore, the method of the present invention does not require the financial institution to purchase a new reader/sorter apparatus in order to create digitized item images.

In one form of the invention a method of digitizing microfilm item images is disclosed, comprising the steps of: (a) reading information on the item; (b) creating a microfilm image of at least one side of the item; (c) developing the microfilm; (d) creating a digitized image of the developed microfilm image; and (e) storing the digitized image.

In another form of the invention, a method of digitizing microfilm bank check images is disclosed, comprising the steps of: (a) reading at least a bank number, an account number and an amount on the bank check; (b) creating a microfilm image of at least one side of the bank check; (c) creating a digitized image of the microfilm image; (d) enhancing the digitized image; and (e) storing the enhanced digitized image.

In another form of the invention, a method of digitizing item images of a plurality of items, comprising the steps of: (a) reading information on each of the plurality of items; (b) sorting the plurality of items using at least a portion of the information read at step (a); (c) creating a digitized image of at least a portion of the sorted items after the sorted items have been sorted; and (d) matching the information read at step (a) with the associated digitized image created at step (c).

In another form of the invention, a method of digitizing images of a plurality of bank checks is disclosed, comprising the steps of: (a) reading at least a bank number, an account number and an amount on each of the plurality of bank checks; (b) sorting the plurality of bank checks using at least a portion of the information read at step (a); (c) creating a digitized image of at least a portion of the sorted bank checks after the sorted bank checks have been sorted; (d) enhancing the digitized images created at step (c); and (e) matching the information read at step (a) with the associated enhanced digitized image created at step (d).

DESCRIPTION OF THE PREFERRED EMBODIMENTS

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 6:
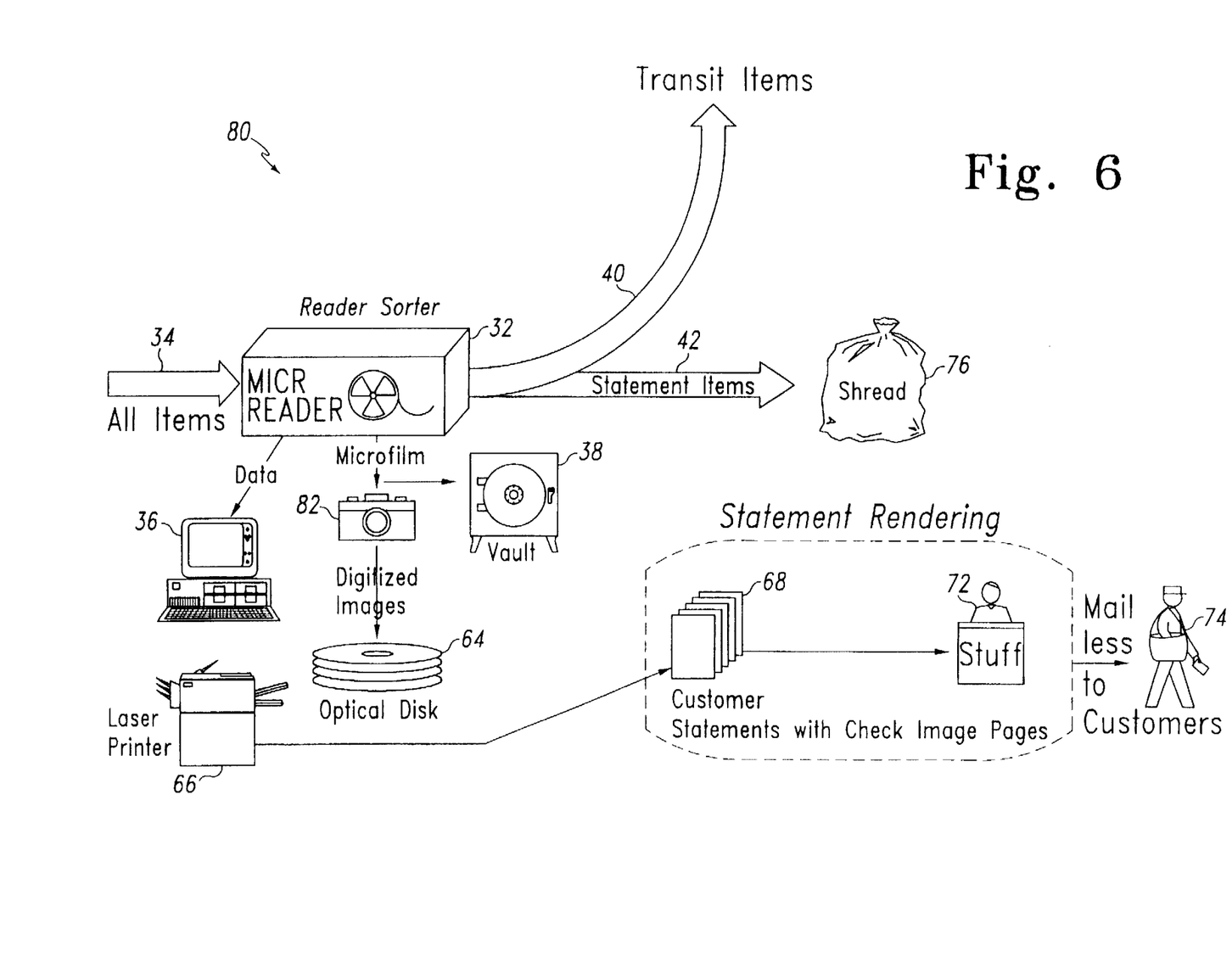
FIG. 6 is a schematic process flow diagram of a first embodiment procedure of the present invention.

FIG. 6 illustrates a first embodiment of the method of the present invention, indicated generally at 80. The process 80 utilizes the MICR reading-endorsing-microfilming-sorting reader/sorter 32 of the process 30 of FIG. 3. Therefore, there is no requirement that the financial institution replace this piece of equipment with a new, more expensive piece of equipment. The reader/sorter 32 is still used to read the MICR data from each item, and this information is still stored on the computer 36. Additionally, the reader/sorter 32 still creates a microfilm image of the front and back of each item. The items are then sorted and the transit items 40 are returned to their originating financial institutions while the statement items 42 are shredded at 76 after a predetermined grace period. However, unlike either the process 30 or the process 60, a digitized image of each item is created by the process 80 off line from the reading and sorting operation. In other words, once the roll of microfilm has been completely filled, it is removed from the reader/sorter 32, developed, and each of the items microfilmed thereon are digitized by the stand alone digitizing camera 82. The digitized images are then stored on a disk storage unit 64 (such as an optical disk). After the digitizing operation, the microfilm is stored for archival purposes in the vault 38, as in the process 30 of FIG. 3.

With the process 80 of FIG. 6, both a microfilm copy and a digitized image of the processed items is created. Because the digitizing is performed off-line, the financial institution can retain its MICR and microfilm reader/sorter 32 which it already owns and which its personnel are already trained to use. Furthermore, there is no requirement that the financial institution purchase another very expensive digitizing reader/sorter 62, as is required with the process 60. Because of this, the process 80 continues to generate microfilm archival copies of each of the items processed by the financial institution. These archival copies may be stored in the vault 38. Unlike the digitized images on the optical disk 64, these microfilm images have the universal legal status of archival copies throughout the world.

However, because the digitizing camera 82 creates a digitized image of each of the processed items, the process 80 exhibits all of the advantages of the MICR reader-endorsing-digitizing-sorting method 60 of FIG. 4. For example, the check sorting process 46 is eliminated, the cancelled checks are not returned to the customers, and lower postage costs are required to return customer statements to the customers. This is because the laser printer 66 generates customer statements 68 using MICR data from the computer 36 as well as digitized images of the cancelled checks from the optical disks 64. It will therefore be appreciated by those skilled in the art that the process 80 incorporates all of the advantages of the prior art processes 30 and 60 without any of the disadvantages of either prior art process.

In a preferred embodiment, the reader/sorter 32 may be any reader/sorter which incorporates an in-line microfilmer, such as an IBM 3890, AT&T GIS 7770, 7780, 6760, or 6790, or a Unisys DP500 or DP1000. It is to be emphasized that the process 80 will function with any reader/sorter 32 which produces a microfilm copy of the processed items and stores the MICR data to a computer disk. The digitizing camera 82 is preferably a model M400XL or M5000XL microfilm digitizer manufactured by Mekel Engineering, Inc. of Walnut, California. The microfilm digitizer is preferably operated with the software products ITools® and TurboScan® produced by Amitech Corporation of Springfield, Virginia. Optical disk storage 64 is preferably a Plasmon RF60J-703-2 optical storage unit manufactured by Multi-Process Computers of Windham, New Hampshire. This drive has 60 platters and 2 drives.

Figure 7:
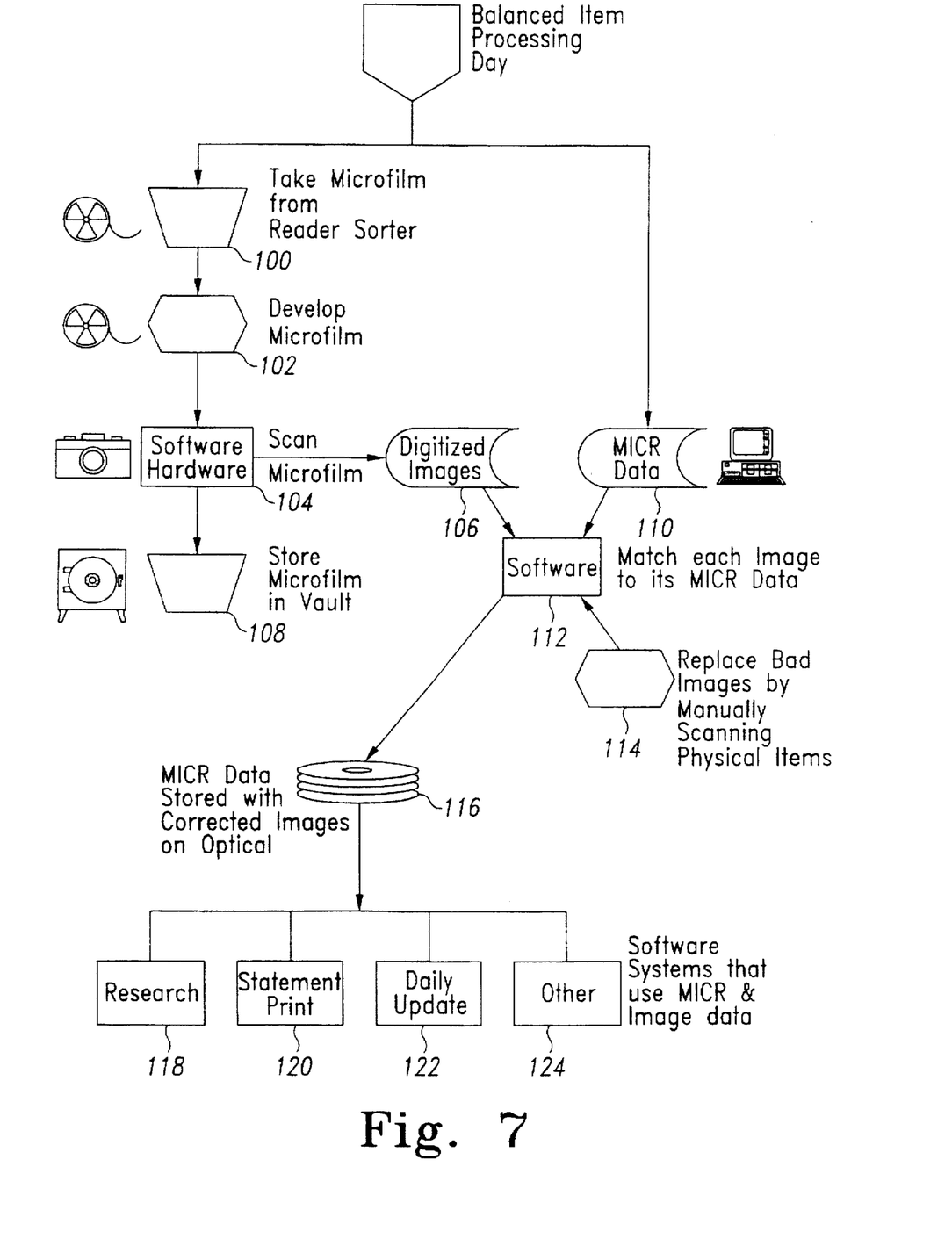
FIG. 7 is a schematic flow chart of the process of FIG. 6.

Referring now to FIG. 7, there is illustrated a schematic flow chart of the first embodiment method of the present invention for a single balanced item processing day. At step 100, the microfilm is unloaded from the reader/sorter 32 and is developed at step 102. The developed microfilm is then loaded into the digitizing camera 82 at step 104, producing digitized images of the microfilm images at step 106. These digitized images are stored on the optical disk storage unit 64. After scanning, the microfilm is retained in the vault 38 as an archival copy at step 108.

Because the digitizing process at step 104 is performed off-line (i.e. the digitizing does not have to occur during the item sorting process within the reader/sorter), higher quality digitized images may generally be produced than those produced by the reader/sorter 62 which includes a built-in digitizer. This is made possible by the slower speed of the digitizing camera 82 and by the use of digital enhancement algorithms in the digitizing camera 82 software. Because this process is run off-line from the main sorting process, the additional time required by the enhancement algorithm does not effect the speed of the item sorting process. The image enhancement of the digitized images may be accomplished by using the ITools® and TurboScan® software, or by any other suitable image enhancement software products.

The MICR data read from each of the items by the reader/sorter 32 is supplied at step 110 from the computer 36. At step 112, software is used to match each of the images stored on the optical disk 64 with the associated MICR data from the computer 36. Such matching of images to MICR data is made possible by a sequence number that is placed on the microfilm with each image and also embedded into the MICR data by the reader/sorter 32. By matching the sequence numbers between the digitized images and the MICR data, it is possible to link the two items. If the software at step 112 determines that any of the digitized images are unreadable, these bad images are replaced at step 114 by manually scanning the physical items to produce a new digitized image. The MICR data is then stored with the matched and corrected digitized images on the optical disk storage unit 64 at step 116. With this combined data stored on the optical disk storage unit 64, this database may be accessed by various software systems such as a research software system 118 which allows copies of individual items to be pulled from the data base for research purposes and the statement print software system 120 which generates monthly account statements to be sent to customers. The statements include both account information as well as the digitized copies of the items posted to the account. Additionally, daily update software 122 may access the MICR data and digitized image data base in order to post this information to customer accounts. Those skilled in the art will recognize that any number of other software programs 124 may be provided which access and use the MICR data and digitized images stored at step 116.

The first embodiment process 80 of the present invention therefore retains the benefits of the prior art process 30, such as allowing the financial institution to retain the reader/sorter 32, which it already owns (a $250,000 investment) and which its employees are already trained to operate, and the continued generation of a microfilm copy of the processed items which may be stored for archival purposes. Also, the process 80 provides the benefits of the prior art process 60 without requiring the financial institution to invest in a new digitizing reader/sorter 62 (a $500,000 investment). These benefits include the elimination of the second check sorting process 46, more efficient research with image processing rather than physical searching, streamlined statement rendering (without matching the physical cancelled checks to each statement) and much lower postage costs. The process 80 of the present invention therefore offers a significant improvement over the prior art processes 30 and 60.

Figure 8:
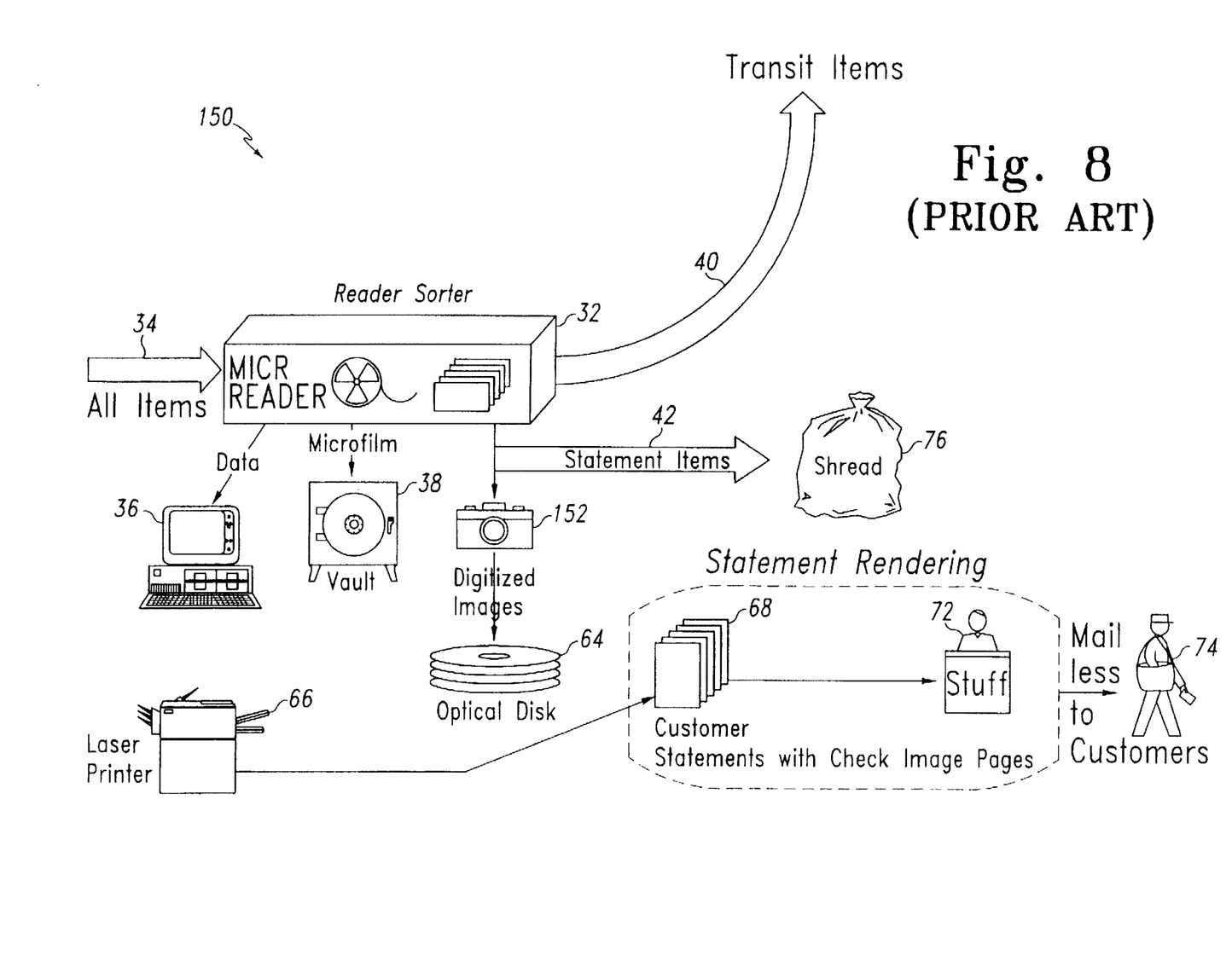
FIG. 8 is a schematic process flow diagram of a second embodiment procedure of the present invention.

Referring now to FIG. 8, a second embodiment of the method of the present invention is illustrated and indicated generally at 150. Like the first embodiment process 80 of FIG. 6, the process 150 utilizes the MICR reading-endorsing-microfilming-sorting reader/sorter 32 of the process 30 of FIG. 3. Therefore, there is no requirement that the financial institution replace this piece of equipment with a new, more expensive piece of equipment. The reader/sorter 32 is still used to read the MICR data from each item, and this information is still stored on the computer 36. Additionally, the reader/sorter 32 still creates a microfilm image on the front and back of each item. The items are then sorted and the transit items 40 are returned to their originating financial institutions while the statement items 42 are shredded at 76 after a pre-determined grace period. However, unlike either the process 30 or the process 60, a digitized image of each item is created by the process 150 off-line from the reading and sorting operation. Furthermore, unlike the process 80 of the present invention, the digitized image is created by the process 150 from the original statement item, rather than from the microfilm image of the original statement item.

Once the microfilm has been created by the reader/sorter 32, it is placed into the vault 38 (with or without developing) for archival storage. Unlike the process 80 of FIG. 6, the process 150 of FIG. 8 creates digitized images directly from the sorted statement items 42 after they have been processed by the reader/sorter 32. The digitizing camera 152 utilized for this process may be, for example a TE1935 document processing system fitted with an MICR reader, produced by the Standard Register Company of Dayton, Ohio. The digitized images are created by the digitizing camera 152 prior to shredding of the statement items 142. Additionally, the MICR data encoded on each item is read by the digitizing camera 152 as each of the statement items 42 are processed. Preferably, the digitizing camera 152 is located near the reader/sorter 32 and may be operated by the same operator. As the reader/sorter 32 is processing the items 34, the sorted statement items 42 may be periodically removed from the appropriate pockets of the reader/sorter 32 and placed into the digitizing camera 152 for digitizing. The digitized images and MICR data produced by the digitizing camera 152 are then stored on a disk storage unit 64 (such as an optical disk). After the digitizing operation, the statement items 42 are stored for an appropriate grace period prior to being shredded at 76.

As with the process 80 of FIG. 6, the process 150 of FIG. 8 allows both a microfilm copy and a digitized image of the processed items to be created. Because the digitizing is performed off-line, the financial institution can retain its MICR and microfilm reader/sorter 32 which it already owns and which its personnel are already trained to use. Furthermore, there is no requirement that the financial institution purchase another very expensive digitizing reader/sorter 62, as is required with the process 60. Because of this, the process 150 continues to generate microfilm archival copies of each of the items processed by the financial institution. These archival copies may be stored in the vault 38. Unlike the digitized images on the optical disk 64, these microfilm images have the universal legal status of archival copies throughout the world.

However, because the digitizing camera 152 creates a digitized image of each of the statement items 42, the process 150 exhibits all of the advantages of the MICR reader-endorsing-digitizing-sorting method 60 of FIG. 4. For example, the check sorting process 46 is eliminated, the cancelled checks are not returned to the customers, and lower postage costs are required to return customer statements to the customers. This is because the laser printer 66 generates customer statements 68 using MICR data from the computer 36 as well as digitized images from the optical disks 64. It will therefore be appreciated by those skilled in the art that the process 150 incorporates all of the advantages of the prior art processes 30 and 60 without any of the disadvantages of either prior art process.

Figure 9:
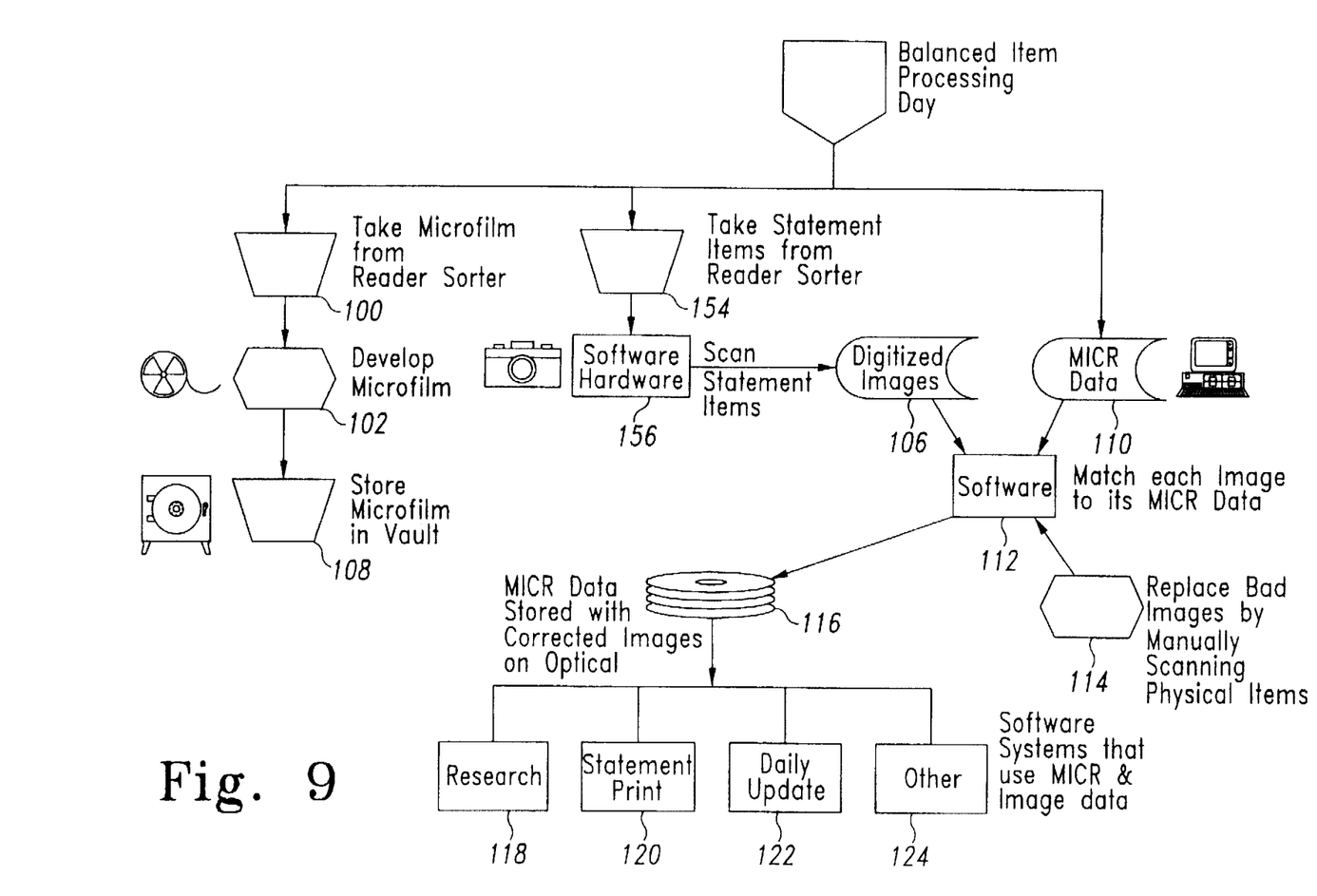
FIG. 9 is a schematic flow chart of the process of FIG. 8.

Referring now to FIG. 9, there is illustrated a schematic flow chart of the second embodiment method of the present invention for a single balanced item processing day. At step 100, the microfilm is unloaded from the reader/sorter 32 and is developed at step 102. The microfilm is then retained in the vault 38 as an archival copy at step 108. Completely separate from this microfilm archiving process, the statement items 42 are retrieved from the reader/sorter 32 at step 154 and these items are then digitized by the digitizing camera 152 at step 156, producing digitized images of the statement items at step 106. The MICR data is also read from the statement items 42 at step 156. These digitized images and the MICR data are stored on the optical disk storage unit 64.

Because the digitizing process at step 156 is performed off-line (i.e. the digitizing does not have to occur during the item sorting process within the reader/sorter 32), higher quality digitized images may generally be produced than those produced by the reader/sorter 62 which includes a built-in digitizer. This is made possible by the slower speed of the digitizing camera 152 and by the use of digital enhancement algorithms for post-processing of the images stored on disk 64. Because this process is run off-line from the main sorting process, the additional time required by the enhancement algorithm does not effect the speed of the item sorting process.

The digitizing camera 152 of the process 150 incorporates a further advantage not found in the process 80 of FIG. 6.

Because the digitizing camera 152 also includes an MICR reader, the digitized images stored on the optical disk 64 include MICR data. This MICR data may be used to help the matching process for matching each of the digitized images with the MICR data in the computer 36. This results in less matching error than relying on the single sequence number which is placed on the microfilm with each image and also embedded into the MICR data in the computer 36 by the reader/sorter 32. The matching performed at step 112 is therefore more accurate when using the digitizing camera 154. The remainder of the process illustrated in FIG. 9 is identical to the process illustrated in FIG. 7.

The second embodiment process 150 of the present invention therefore retains the benefits of the prior art process 30, such as allowing the financial institution to retain the reader/sorter 32, which it already owns (a $250,000 investment) and which its employees are already trained to operate, and the continued generation of a microfilm copy of the processed items which may be stored for archival purposes. Also, the process 150 provides the benefits of the prior art process 60 without requiring the financial institution to invest in a new digitizing reader/sorter 62 (a $500,000 investment). These benefits include the elimination of the second check sorting process 46, more efficient research with image processing rather than physical searching, streamlined statement rendering (without matching the physical canceled checks to each statement), and much lower postage costs. The process 150 of the present invention therefore offers a significant improvement over the prior art processes 30 and 60.

Furthermore, the second embodiment process 150 offers improvements over the first embodiment process 80. For example, it is not necessary that a complete microfilm be exposed by the reader/sorter 32 before digitized images may be stored onto the optical disk 64, as is required with the first embodiment process 80. Instead, the second embodiment process 150 allows digitized images of the statement items 42 to be created in parallel to the reading and sorting process. Sorted statement items 42 may be periodically removed from the reader/sorter 32 and digitized while the reader/sorter 32 continues to sort the remaining items 34. There is therefore no delay while waiting for all of the items 34 to be processed by the reader/sorter 32 or while waiting for the microfilm produced by the reader/sorter 32 to be developed. This significantly streamlines the entire process. Furthermore, the digitizing camera 152 allows the MICR data to be read from each statement item 42 as its image is being digitized, thereby increasing the reliability of matching the digitized images with the MICR data stored on the computer 36.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of digitizing microfilm item images, comprising the steps of:
    (a) reading information on the item;
    (b) creating a microfilm image of at least one side of the item;
    (c) developing the microfilm;
    (d) creating a digitized image of the developed microfilm image;
    (e) re-reading at least a portion of the information on the item which is digitized at step (d); and
    (f) matching the information read at step (a) with the associated digitized image created at step (d), wherein step (f) is performed by matching the information read at step (a) with the information re-read at step (e).

2. A method of digitizing microfilm bank check images, comprising the steps of:
    (a) reading at least a bank number, an account number and an amount on the bank check;
    (b) creating a microfilm image of at least one side of the bank check;
    (c) creating a digitized image of the microfilm image;
    (d) enhancing the digitized image;
    (e) re-reading at least a portion of the information on the bank check which is digitized at step (c); and
    (f) matching the information read at step (a) with the associated digitized image created at step (c), wherein step (f) is performed by matching the information read at step (a) with the information re-read at step (e).

3. A method of digitizing item images of a plurality of items, comprising the steps of:
    (a) reading information on each of the plurality of items;
    (b) sorting the plurality of items using at least a portion of the information read at step (a);
    (c) creating a digitized image of at least a portion of the sorted items after the sorted items have been sorted;
    (d) re-reading at least a portion of the information on the items which are digitized at step (c); and
    (e) matching the information read at step (a) with the associated digitized image created at step (c), wherein step (e) is performed by matching the information read at least (a) with the information re-read at step (d).

4. The method of claim 3, wherein step (c) comprises creating a digitized image directly from the sorted items.

5. The method of claim 3, wherein step (c) further comprises:
    (c.1) creating a microfilm image of at least a portion of the sorted items; and
    (c.2) creating a digitized image of at least a portion of the sorted items after the sorted items have been sorted, wherein the digitized image is created from the corresponding microfilm image.

6. The method of claim 3, wherein step (a) comprises reading magnetic ink characters on the item using a magnetic ink character recognition process.

7. The method of claim 3, wherein the item is a bank check.

8. The method of claim 7, further comprising the step of:
    (f) endorsing the bank check.

9. The method of claim 3, further comprising the step of:
    (e) storing the digitized image.

10. The method of claim 9, wherein step (e) comprises storing the digitized image on an optical disk storage unit.

11. The method of claim 3, further comprising the step of:
    (e) creating a transaction data file on a computer which contains at least a portion of the numeric information read in step (a).

12. The method of claim 11, further comprising the step of:
    (f) rendering a statement using both the transaction data and the digitized image.

13. The method of claim 9, further comprising the step of:
    (f) enhancing the digitized image using an enhancement algorithm prior to storing the digitized image.

14. A method of digitizing images of a plurality of bank checks, comprising the steps of:
 (a) reading at least a bank number, an account number and an amount on each of the plurality of bank checks;
 (b) sorting the plurality of bank checks using at least a portion of the information read at step (a);
 (c) creating a digitized image of at least a portion of the sorted bank checks after the sorted bank checks have been sorted;
 (d) re-reading at least a portion of the information on the bank checks which are digitized at step (c); and
 (e) matching the information read at step (a) with the associated enhanced digitized image created at step (c), wherein step (e) is performed by matching the information read at step (a) with the information re-read at step (d).

15. The method of claim 14, wherein step (a) comprises reading magnetic ink characters on the bank check using a magnetic ink character recognition process.

16. The method of claim 14, further comprising the step of:
 (f) endorsing the bank check.

17. The method of claim 14, wherein step (c) comprises creating a digitized image of the front side and the back side of the bank check.

18. The method of claim 14, further comprising the step of:
 (f) storing the enhanced digitized images.

19. The method of claim 18, wherein step (f) comprises storing the enhanced digitized images on an optical disk storage unit.

20. The method of claim 14, further comprising the step of:
 (f) creating a transaction data file on a computer which contains at least a portion of the information read at step (a).

21. The method of claim 20, further comprising the step of:
 (g) rendering a statement using both the transaction data and the stored enhanced digitized images.

* * * * *

UNITED STATES PATENT AND TRADEMARK OFFICE
CERTIFICATE OF CORRECTION

PATENT NO : 5,790,260

DATED : August 4, 1998

INVENTOR(S) : Charles G. Myers

It is certified that error appears in the above-identified patent and that said Letters Patent is hereby corrected as shown below:

On the cover page, under ASSIGNEE, please change "Financial Ware, Inc." to --Financialware, Inc-
In column 8, line 15, please change "microffim" to --microfilm--.

Signed and Sealed this

Eighth Day of February, 2000

Attest:

Attesting Officer

Q. TODD DICKINSON

Commissioner of Patents and Trademarks